March 19, 1929.  W. E. WINE  1,705,796
TRACTION WHEEL
Filed March 2, 1925  2 Sheets-Sheet 2
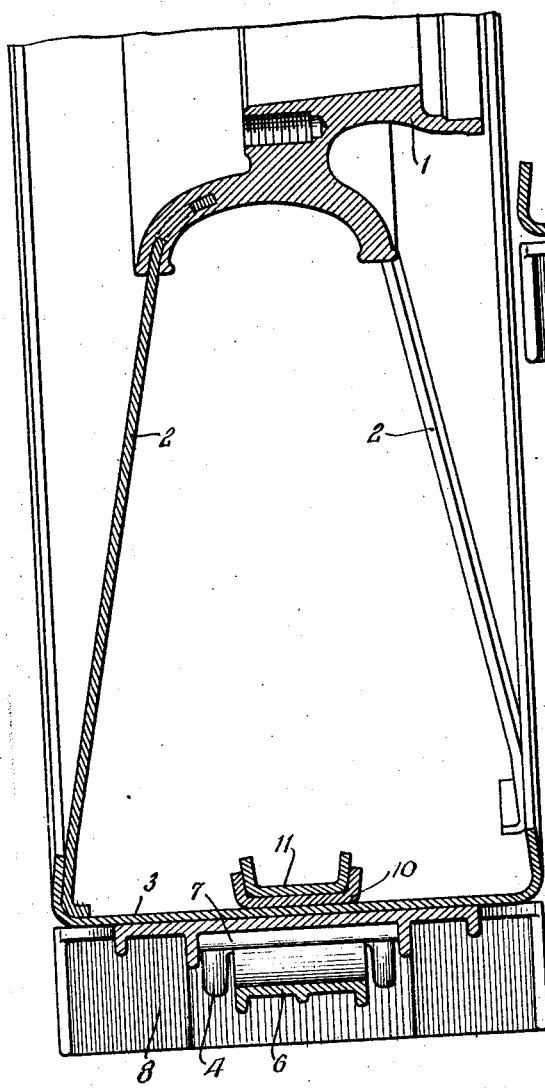
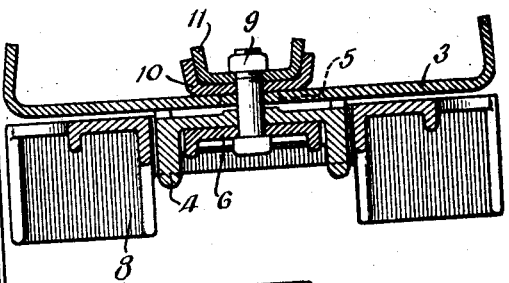
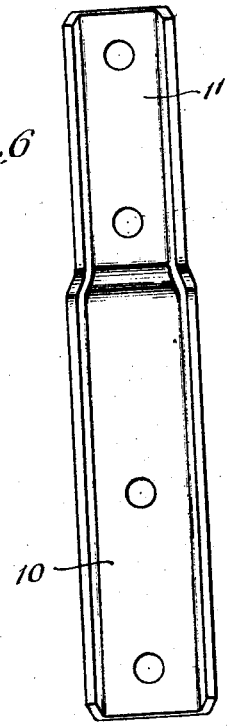
Inventor;
William E. Wine
By: Wm. O. Bel. atty.

Patented Mar. 19, 1929.

1,705,796

UNITED STATES PATENT OFFICE.

WILLIAM E. WINE, OF TOLEDO, OHIO, ASSIGNOR TO THE WINE RAILWAY APPLIANCE COMPANY, OF TOLEDO, OHIO, A CORPORATION OF OHIO.

TRACTION WHEEL.

Application filed March 2, 1925. Serial No. 12,489.

This invention relates to a novel and improved traction wheel and more particularly to means for reinforcing and strengthening wheels which are not equipped with traction shoes, so that they may be so equipped and still possess the requisite strength. It is the principal object of my invention to provide a reinforcing means which may be readily applied to existing wheels, without material modification thereof.

A further object of my invention is to provide a reinforcing means which may be readily applied to the rim of a traction wheel and fastened thereto by means which also serve to hold in place the traction shoes mounted on the rim.

A still further object of my invention is to provide a traction wheel having teeth co-operating with the rim thereof and fastened to the rim, and provided with means for relieving the fastening means of shearing stress, the arrangement being such that the teeth may be readily applied to wheels of standard make.

In the accompanying drawings in which I have shown a selected embodiment of my invention.

Fig. 4 is a sectional view on the line 4—4 of Fig. 3, but extended to show the hub.

Fig. 5 is a section on the line 5—5 of Fig. 3.

Fig. 6 is a detail view of one of the members of the supplementary rim.

Figure 1:
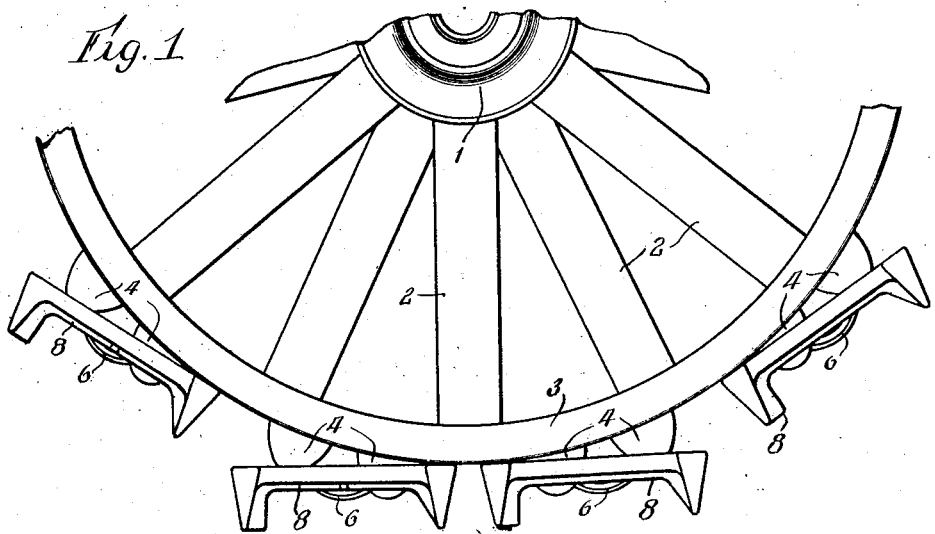
Fig. 1 is an elevation of a portion of a wheel of well known make having my invention embodied therein.

Referring now to the drawings, the numeral 1 designates the hub of a traction wheel of well known make to which are connected a plurality of spokes 2 joined at their outer ends to a rim 3. In this particular make of wheel, the rim is formed of a wide plate secured at its edges to the spokes. When such a wheel is to be supplied with traction shoes, it has been found that the rim is lacking in strength sufficient to prevent bellying thereof or other distortion or even breaking.

To provide sufficient strength so that the wheel may be used with traction shoes, I provide the rim with a supplementary rim disposed preferably on the interior thereof and centrally between the edges so as to form a support for the shoes. This supplementary rim may take a plurality of forms, as it is possible to make it of any desired structural shape and to make it in one or a plurality of pieces. I have shown, however, a form which I have found to be very satisfactory in actual practice and in which form the supplementary rim is composed of a plurality of members of channel section. These members are identical and are preferably made of a length, such that when they are placed in overlapping position as plainly shown in Fig. 2, bolts may be passed through apertures therein and in the rim 3 and will be in a position to secure teeth 4 to the rim. These teeth are provided with lips 5 received within apertures in the rim so as to relieve the bolts of the shearing stress thereon. The teeth are connected together by a bridge member 6, which also acts as a holder engaging the transverse bar 7 of the traction shoe 8, to loosely secure the shoe to the rim. The teeth, except as described above, and the shoe, may be of any desired form, although I have shown them of the form described and claimed in the co-pending application Serial No. 21,730 filed April 8, 1925.

The lips 5 may be made of any desired width, which may be found desirable or necessary to take up the shear, but I have found that these lips may be relatively narrow thereby avoiding the necessity for providing a large aperture in the rim to receive them. The bridging member 6 acts to not only hold the shoe on the rim, but also to transmit shear from one tooth to the other so that the bolts 9, which pass through the bridging member, tooth, rim and reinforcing members, and the lips 5 act together to receive the shearing stress, thus preventing the stress from being borne by any one member.

Figure 2:
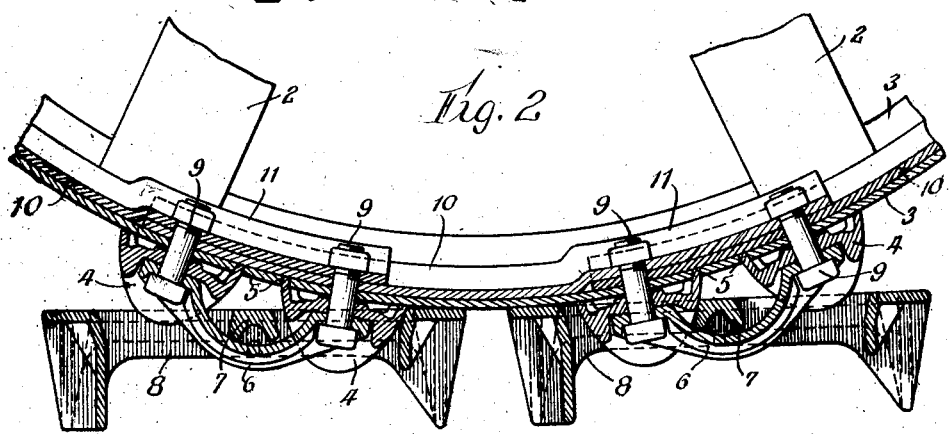
Fig. 2 is a circumferential section of the wheel shown in Fig. 1 on an enlarged scale, the section being taken normal to the axis of the wheel.
Figure 3:
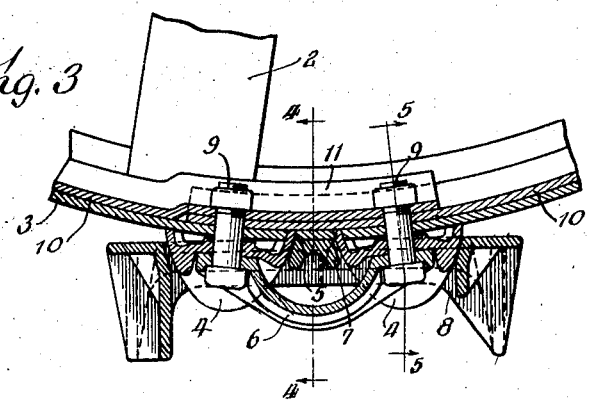
Fig. 3 is a section taken on the same plane as Fig. 2, but showing one of the shoes in a different position relative to the rim.

The complementary rim members are formed of a relatively wide portion 10 lying against the interior of the rim and terminating in a relatively narrow portion 11 bent inwardly a distance sufficient to overlap the portion 10 of the next member to which it is secured by the bolts 9, as will be plainly seen in Figs. 2 and 3.

From the above it will be apparent that I have provided a traction wheel having a supplementary rim which may be readily applied to rims of existing wheels without necessitating any radical change therein. All that is necessary is the drilling or punching of the necessary apertures in the rim to receive the bolts 9 and the lips 5 of the teeth. The result is that a wheel, such as a wheel of the well known type illustrated, may be provided with these apertures and they may be used with or without the traction shoes as desired, it only taking a short time to install or remove the teeth, shoes and supplementary rim. When installed the teeth and shoes will have substantially the same advantages and mode of operation as set forth in my aforesaid copending application and the rim will be sufficiently strong to support the shoes and transmit tractive effort without distortion or breakage.

I am aware that changes in the form, construction and arrangement of parts may be made without departing from the spirit and without sacrificing the advantages of the invention and I reserve the right to make all such changes as fairly fall within the scope of the following claims.

I claim:

1. A traction wheel comprising a rim, and a supplementary channel shaped rim made up of overlapping members associated therewith to reinforce the same.

2. A traction wheel comprising a rim, spokes connected with the rim at the edges thereof, and a supplementary rim made up of overlapping channel shaped members disposed between the spokes on the inside of said wheel rim and continuous therewith to reinforce the same.

3. A traction wheel comprising a rim, a supplementary continuous rim made up of overlapping channel shaped members disposed on the inside of said wheel rim, teeth on the outside of said rim, and a common means for fastening said teeth and said supplementary rim to said wheel rim.

4. A traction wheel comprising a rim, a continuous supplementary rim made up of overlapping members disposed inside said wheel rim to strengthen the same, a plurality of teeth on the outside of said rim, and bolts passing through said teeth and said rims to secure them together.

5. A traction wheel comprising a rim, a continuous supplementary rim on the inside of the wheel rim and comprising a plurality of channel members having overlapping ends, a plurality of teeth on said rim and spaced around the periphery thereof, and means passing through said teeth, said wheel rim and said overlapping members to secure the parts together.

6. A traction wheel comprising a rim, a continuous supplementary rim on the inside of the wheel rim and comprising a plurality of channel members with overlapping ends, and means for securing said overlapping ends to said wheel rim.

7. A traction wheel comprising a rim, a continuous supplementary rim formed of a plurality of members, each member comprising a channel having a relatively wide portion lying against the interior of the rim and terminating in a relatively narrow portion bent inwardly away from the rim to overlap the relatively wide portion of the next member, and means securing said overlapping portions to said wheel rim.

8. A traction wheel comprising a rim formed of a plate, and a relatively narrow continuous supplementary rim made up of overlapping channel members disposed substantially centrally of said plate on the inside thereof.

9. A traction wheel comprising a rim formed of a plate, a supplementary rim disposed on the inner surface of said plate, said supplementary rim being formed of a plurality of members having overlapping ends, a plurality of teeth on the outer surface of said wheel rim, said teeth being placed in pairs opposite said overlapping ends, and means passing through said teeth and said overlapping ends to secure the parts together.

10. A traction wheel comprising a rim, a supplementary rim secured to the wheel rim, said supplementary rim comprising a plurality of overlapping channel shaped members, each member having a relatively narrow part and a relatively wide part, the wide part being adapted to receive the narrow part of an adjacent member.

11. A traction wheel comprising a rim, a supplementary rim secured to the wheel rim, said supplementary rim comprising a plurality of overlapping channel shaped members, each member having a relatively narrow part and a relatively wide part, said parts being offset and the wide part being adapted to receive the narrow part of an adjacent member.

WILLIAM E. WINE.